(12) United States Patent
Ohi

(10) Patent No.: US 6,807,664 B1
(45) Date of Patent: Oct. 19, 2004

(54) MULTIAPPLICATION CONCURRENT-EXECUTION INTERPRETER EXECUTION METHOD THEREFOR AND COMPUTER-READABLE STORAGE MEDIUM STORING PROGRAM THEREFOR

(75) Inventor: Hirokazu Ohi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,192

(22) Filed: Dec. 17, 1999

(30) Foreign Application Priority Data

Dec. 25, 1998 (JP) .......................................... 10-369920

(51) Int. Cl.$^7$ ................................................ G06F 9/45
(52) U.S. Cl. ...................... 717/164; 717/166; 719/312; 719/332
(58) Field of Search .............................. 707/101–104.1; 709/312, 400, 332; 717/116, 118, 119, 139, 141, 148, 149, 166, 164; 719/312, 332

(56) References Cited

U.S. PATENT DOCUMENTS

| | | | |
|---|---|---|---|
| 6,005,942 A | * 12/1999 | Chan et al. ................. | 235/379 |
| 6,317,872 B1 | * 11/2001 | Gee et al. .................... | 707/206 |
| 6,374,286 B1 | * 4/2002 | Gee et al. ....................... | 709/1 |
| 6,405,099 B1 | * 6/2002 | Nagai et al. ................ | 700/159 |
| 6,405,367 B1 | * 6/2002 | Bryant et al. ............... | 717/115 |

OTHER PUBLICATIONS

Di Giorgio, Rinaldo, "Smart cards and the OpenCard Framework", JavaWorld, Jan. 1998, retrieved from www.javaworld.com/javaworld/jw–01–1998/jw–01–javadev_p.html on Aug. 06, 2002.*

Ripps, David L., "Java for embedded systems", JavaWorld, Sep. 1996, retrieved from www.javaworld.com/javaworld/jw–09–1996/jw–09–ripps.html on Aug. 06, 2002.*

* cited by examiner

Primary Examiner—Tuan Dam
Assistant Examiner—Mary Steelman
(74) Attorney, Agent, or Firm—Fitzpatrick, Cella, Harper & Scinto

(57) ABSTRACT

An interpreter serves for a programming language. It first receives information specifying names and the like of multiple applications written in the programming language. Then, the interpreter generates individual application areas corresponding to the applications for storing data required for execution of the applications. It also generates a task for each of the applications and executes the application in the task. If the interpreter detects a new class in required classes during execution of the individual applications, it loads bytecodes for the new class in a shared area. Also, if the new class has a class variable, the interpreter allocates a class variable area for the class variable which corresponds to the application. Furthermore, to access a class variable during execution of an application, the interpreter accesses a class variable area for the class variable in the individual application area corresponding to the application.

39 Claims, 5 Drawing Sheets

FIG. 3

301: CLASS VARIABLE TABLE

| CLASS | | X | | | Y | | | Z | | | ... | |
|---|---|---|---|---|---|---|---|---|---|---|---|---|
| CLASS VARIABLES | | x | y | z | ... | ... | ... | ... | ... | ... | ... | ... |
| APPLICATIONS | A | 301a | 301b | 301c | | | | | | | | |
| | B | 301d | 301e | 301f | | | | | | | | |
| | C | 301g | 301h | 301i | | | | | | | | |

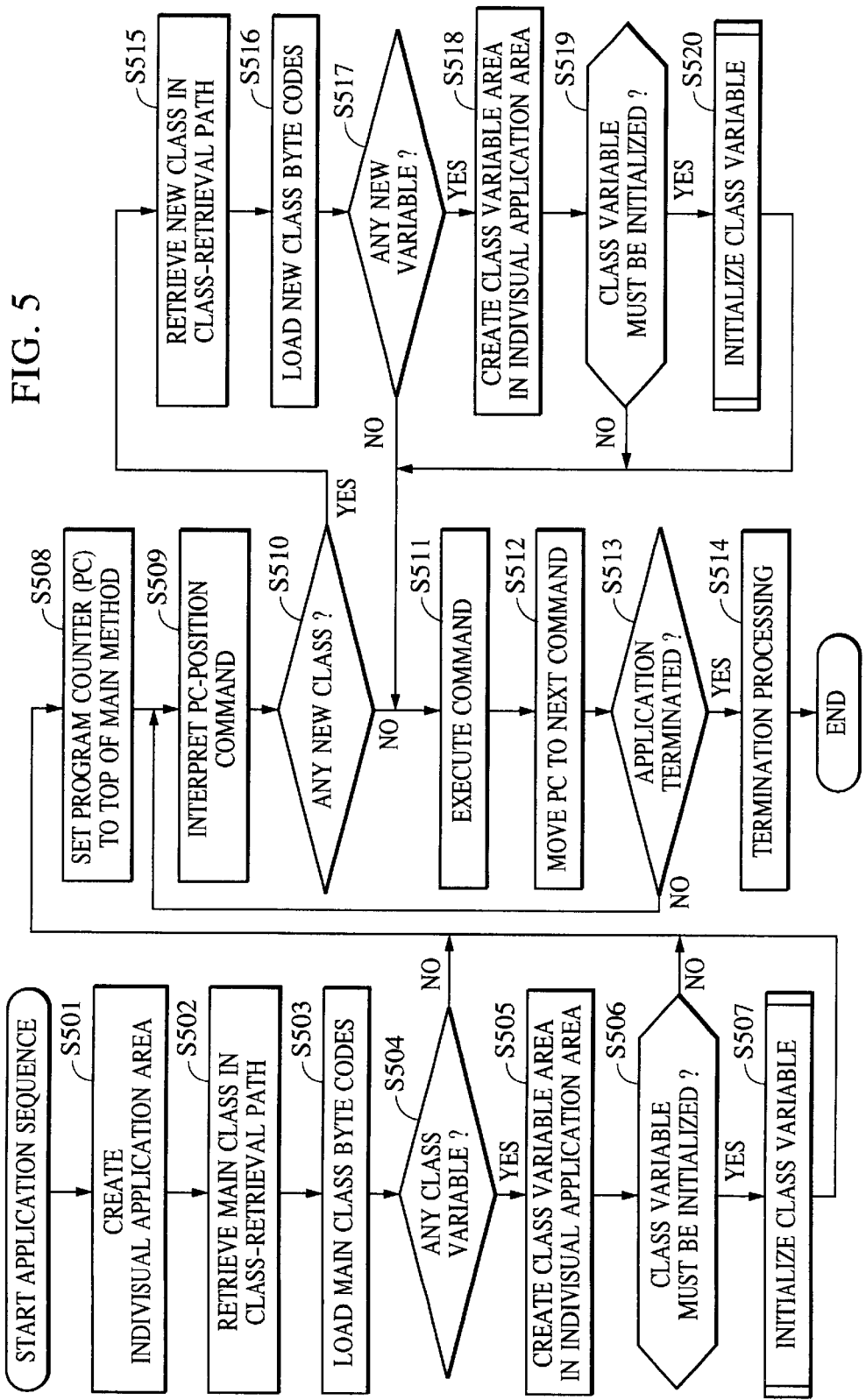

MULTIAPPLICATION CONCURRENT-EXECUTION INTERPRETER EXECUTION METHOD THEREFOR AND COMPUTER-READABLE STORAGE MEDIUM STORING PROGRAM THEREFOR

BACKGROUND OF THE INVENTION

1. Field of the Invention

The present invention relates to an interpreter capable of concurrently executing multiple applications, an execution method for the interpreter, and a computer-readable storage medium storing an information processing program for implementing the execution method.

2. Description of the Related Art

Hitherto, interpreters with multiple paths for interpreting a programming language and for executing programs written in the programming language on a computer have been supplied. For example, a multithread-supporting interpreter is one of the above-mentioned interpreters, which is capable of performing numerical operations and network communication concurrently. In this case, a computer executes one application program integrally composed of elements for processing allocated in the individual threads that function as execution paths.

With the above-mentioned technique, however, functions to be executed by the interpreter must be incorporated as one application program. This makes it difficult for the interpreter to implement multiple functions, and lacks in providing flexibility and extendibility in program description. Higher flexibility in program description can be obtained in methods such as a modular programming method and a building-block method which realize one function by one application. In view of the above, a number of methods can be considered for allowing execution of multiple applications.

A first method which can be considered is to activate multiple interpreters and use each of the interpreters to execute each application. With this method, however, one computer has multiple instances of an interpreter, thereby wasting memory.

A second method which can be considered is to provide a selectively executing program D and to control the program to execute one or more applications selected from multiple applications, for example, three applications A, B, and C. In the second method, however, it is a time-consuming job to create or prepare the selectively executing program D. Also, every time a change, for example, in the number and type of applications to be started, occurs, the selectively executing program D must be modified, causing the method to be complicated.

Also, as a basic problem, the second method occasionally terminates applications without being properly executed. In standard object-oriented programming, classes are employed to represent types of objects, and there are cases in which class variables to be shared among multiple objects generated by identical classes are used.

Also, in the above second method, one instance is provided for each class variable to be generated in an interpreter. In this case, consistency regarding the use of class variables is required among applications; otherwise, problems are caused. For example, for a class variable y belonging to a class X, when the application B performs initialization with an initial value "1", and the application C performs initialization with an initial value "0", if the individual applications B and C continue execution on condition that the class variable y is not changed, that is remaining as the initial value, unexpected results are produced as a matter of course.

To prevent a problem such as that described above, rules for restricting use of class variables among applications must be applied when creating the application. However, this results in an increase of restrictions for description of application programs. In addition, problems remain unresolved in that operation of existing applications cannot be guaranteed.

SUMMARY OF THE INVENTION

Accordingly, it is an object of the present invention to provide an interpreter capable of concurrently executing multiple applications without preliminarily incorporating multiple functions that operate with the interpreter as one application Another object of the invention is to provide an interpreter that realizes multiple functions and allows improved flexibility and extendibility in program description.

To achieve these objects, according to one aspect of the present invention, an interpreter for a programming language supporting class variables comprises receiving means for receiving specifying information for specifying applications written in the programming language; generating means for generating individual application areas corresponding to the applications, the individual application areas being for storing data required for execution of the applications specified with the specifying information; allocating means for allocating class variable areas for the class variables in the individual application areas corresponding to the specified applications if new classes having class variables are detected from classes required to execute the specified applications; executing means for executing the specified applications; and accessing means for accessing the class variables in the individual application areas corresponding to the applications when the class variables are to be accessed while the specified applications are being executed by the executing means.

According to another aspect of the present invention, a method for executing applications by an interpreter for a programming language supporting class variables comprises a receiving step for receiving specifying information for specifying applications written in the programming language; a generating step for generating individual application areas corresponding to the applications, the individual application areas being for storing data required for execution of the applications specified with the specifying information; an allocating step for allocating class variable areas for the class variables in the individual application areas corresponding to the specified applications if new classes having class variables are detected from classes required for executing the specified applications; and an executing step for executing the specified applications; wherein the class variables in the individual application areas corresponding to the applications are accessed while the specified applications are being executed in the executing step.

According to still another aspect of the present invention, a computer-readable storage medium storing an information processing program for controlling a computer to perform functions of an interpreter for a programming language supporting class variables, wherein the information processing program comprises codes for instructing the computer to perform a receiving step for receiving specifying information for specifying applications written in the programming language; a generating step for generating individual application areas corresponding to the applications, the individual application areas being for storing data required for execution of the applications specified with the specifying information; an allocating step for allocating class variable areas for the class variables in the individual application areas corresponding to the specified applications if new classes having class variables are detected from classes required to execute the specified applications; and an executing step for executing the specified applications; wherein the class variables in the individual application areas corresponding to the applications are accessed while the specified applications are being executed in the executing step.

Further objects, features and advantages of the present invention will become apparent from the following description of the preferred embodiments with reference to the attached drawings.

BRIEF DESCRIPTION OF THE DRAWINGS

FIG. 3 is a view of a structural example of a class variable table;

FIG. 5 is a flowchart of application-execution steps.

DESCRIPTION OF THE PREFERRED EMBODIMENTS

Hereinbelow, referring to the accompanying drawings, a description will be given of a preferred embodiment of the present invention.

Figure 1:
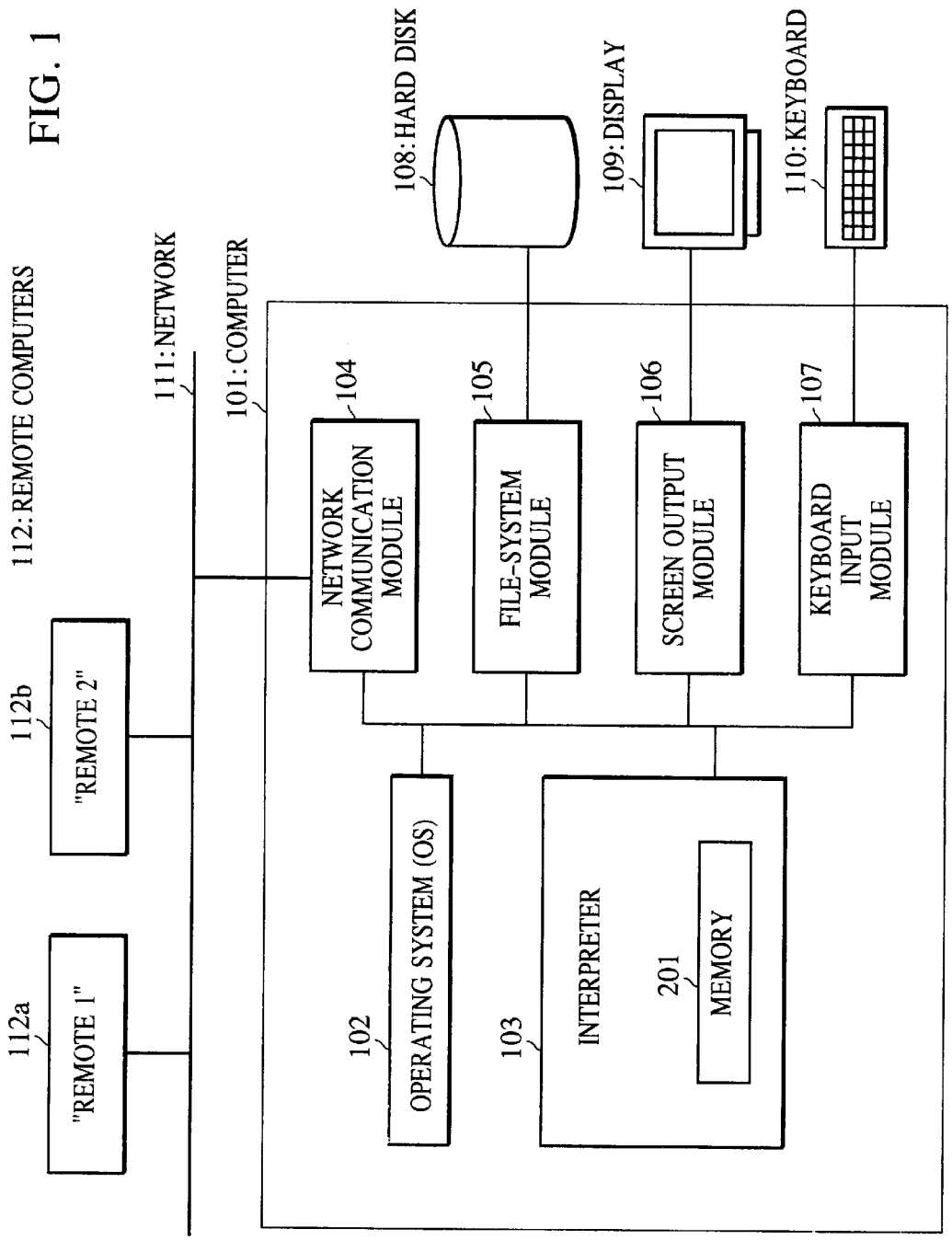
FIG. 1 is a schematic view of an interpreter system according to an embodiment of the present invention.

FIG. 1 is a schematic diagram of an interpreter system according to the embodiment of the present invention.

In the figure, a computer 101 has an operating system (OS) 102, an interpreter 103, a network communication module 104, a file system module 105, a screen output module 106, and a keyboard input module 107. Functional blocks 102 to 107 represent functions which operate according to a program which runs through execution of a CPU. The program is stored in a memory made of a medium, such as a read-only memory (ROM) and a random access memory (RAM). A hard disk 108 stores bytecodes of various classes, and also serves as an input source medium or an output destination medium for data of various types. A display 109 displays data of various types on screens. A keyboard 110 has various input keys.

The OS 102 completely controls operations of the computer 101. The interpreter 103 interprets and executes bytecodes written in an object-oriented programming language. A memory 201 contains information required for execution which the interpreter 103 performs. The network communication module 104 controls communication to be performed with remote resources via a network 111. The file system module 105 performs read-write access to file systems stored in the hard disk 108. The screen output module 106 displays console screens and window screens on the display 109. The keyboard input module 107 receives data inputted from the keyboard 110.

The network 111 serves as channels for communication with remote devices, such as communication between the computer 101 and one of remote computers 112a and 112b.

The individual remote computers 112a and 112b store bytecodes of various classes, and have storage media (not shown) to be used as an input source and an output destination for various types of data. With these storage media, read-write data and user-inputted data can be exchanged between the remote computers 112a and 112b and the computer 101.

Figure 2:
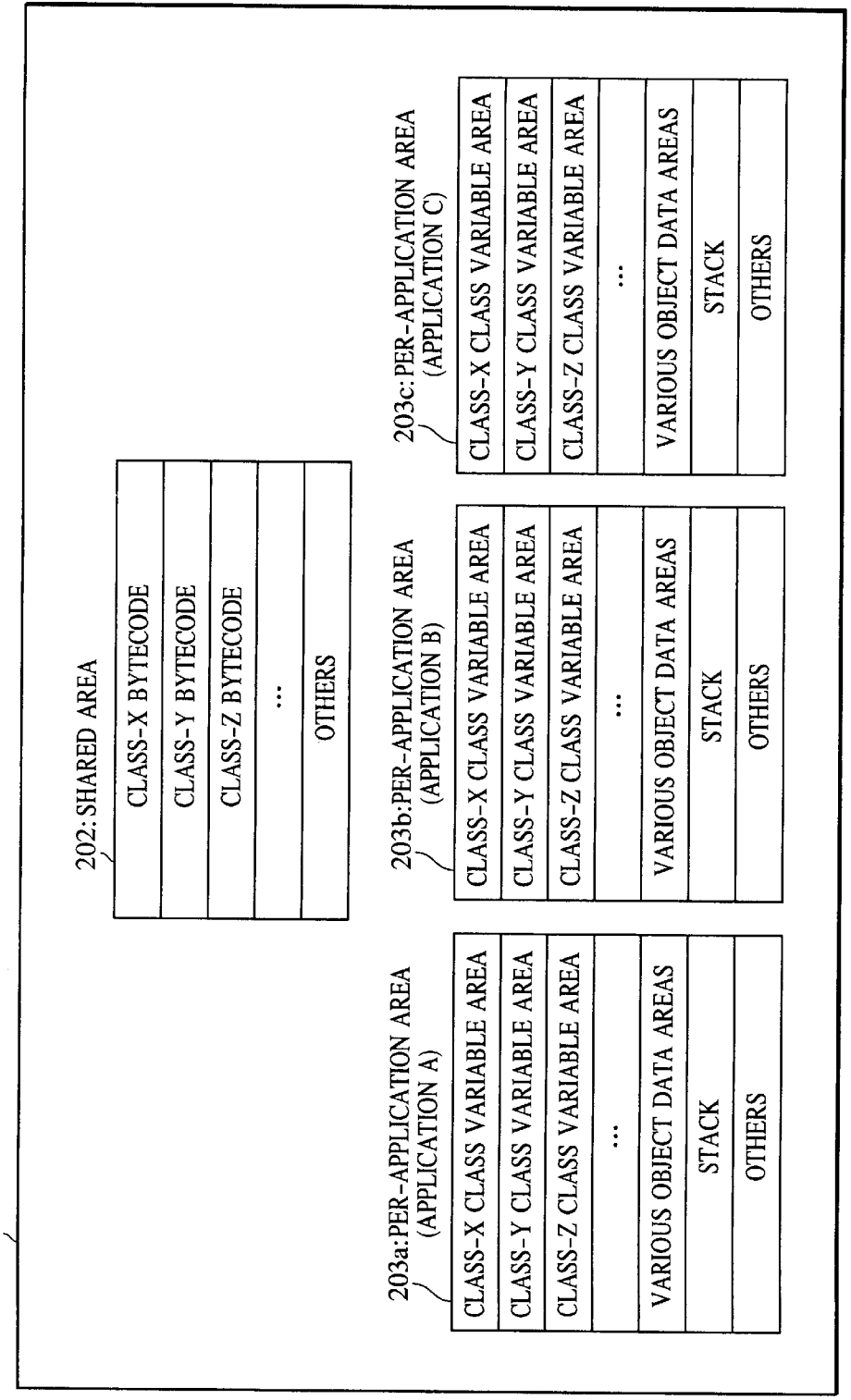
FIG. 2 is a view of contents of a memory used by the interpreter.

FIG. 2 shows contents of currently executing applications in the memory 201 which the interpreter system uses. As shown in the figure, the memory 201 has a shared area 202 and individual application areas 203a, 203b, and 203c. The shared area 202 stores data uniquely required by the interpreter system, that is, data to be shared in execution of multiple applications. The individual application areas 203a, 203b, and 203c are allocated for individual applications for storing data required for execution of the individual applications. FIG. 2 shows a case in which applications A, B, and C are executing, and the three individual application areas 203a, 203b, and 203c corresponding thereto are allocated.

In this case, bytecodes of classes which the interpreter system has loaded are stored in the shared area 202. The bytecodes represent information related to a corresponding class. The information includes method information (including a method command sequence), field information (information on instance variables and class variables, including class-variable initial data), constant data, and symbols.

As described above, since bytecodes do not differ depending upon the application, they are stored in the shared area 202. This avoids duplicated storage of the same bytecodes in the individual application areas 203a, 203b, and 203c, thereby allowing memory to be saved.

The individual applications do not always use all classes whose bytecodes are loaded into the shared area 202. In execution of the individual applications, classes are loaded into the shared area 202 as and when they are called. Even when the application A is using a class X, the application B is using a class Y, and the application C is using a class Z, the shared area 202 remains in a state shown in FIG. 2.

The individual application areas 203a, 203b, and 203c store data required for proper operation of corresponding applications; that is, they store data required by independent instances for individual applications. The data to be stored therein includes class variable areas, various object data areas, and stacks.

Class variable areas may be allocated only for classes required by the application to be operated. In FIG. 2, the individual applications A, B, and C are using all the classes X, Y, and Z. However, for example, when one of the applications is not using all the classes, class variable areas need not be allocated for unnecessary classes.

One or more multiple class variables may be defined for one class. When an application uses a class, areas for all write-permitting class variables belonging to the class are allocated in the individual application areas 203a, 203b, and 203c.

FIG. 3 shows a structural example of a class variable table. A class variable table 301 has write-permitting class variables x, y, and z for class X. When all applications A, B, and C use the class X, data storage areas 301a to 301i are allocated. In this example, class variable areas are shown in a table in a different mode from FIG. 2, and the line of the application A, for example, is intended to correspond to the class variable areas of the individual application area 203a.

In the above case, areas are allocated for all write-permitting class variables. However, this allocation method is not always required. For example, there is a method in which checking is performed whether or not areas have been allocated for individual class variables when the class variables are used, and if the areas have not yet been allocated, the areas are then allocated. According to this method, allocation only for variables to be actually used is sufficient, thereby allowing memory-use requirements to be reduced.

Also, write-permitting classes are arranged to be execution objects because read-only class variables are already included in bytecodes in the shared area 202, and values thereof are unchangeable. Therefore, to obtain these values, simple reference thereto is sufficient, not requiring reallocation for each application.

The interpreter system is configured as described above. Hereinbelow, a description will be given of operations which the interpreter system performs, with reference to flowcharts in FIGS. 4 and 5.

Figure 4:
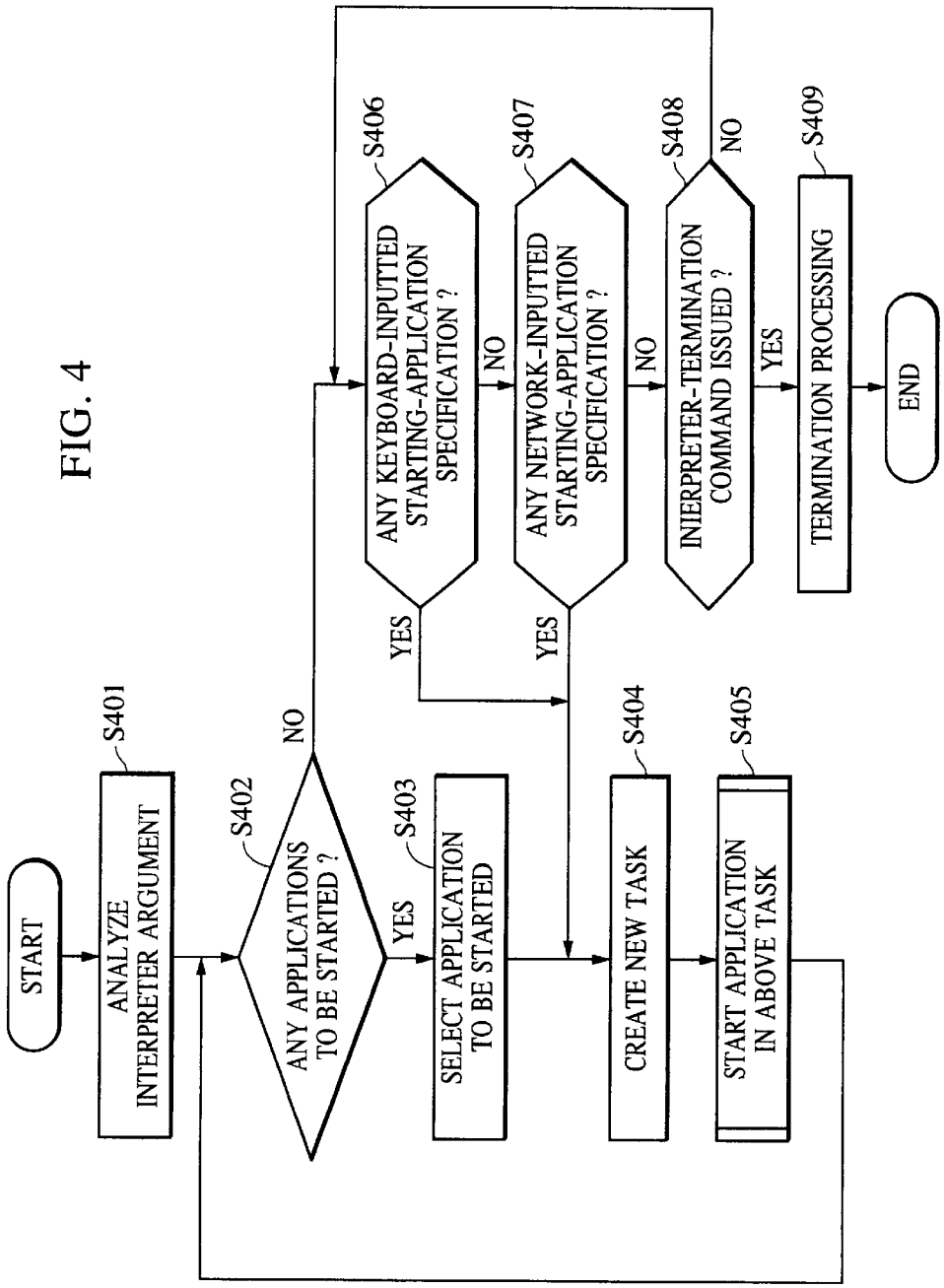
FIG. 4 is a flowchart of operation steps which the interpreter performs.

FIG. 4 shows a flowchart of operation steps to be performed by the interpreter 103.

First, the interpreter 103 starts upon receipt of arguments entered by specification of applications required to be started. The interpreter 103 analyzes the arguments (step S401), and then checks whether the arguments include applications not yet started (step S402). If applications not yet started have been detected, the interpreter 103 selects an application to be started from the applications not yet started (step S403). Generally, selection of this type is performed in the order of specifications inputted with the arguments, but no restriction should be applied thereto.

Subsequently, a new task for multitasks to be provided by the OS 102 is created via an application-programming interface (API) (step S404), and the application selected in the aforementioned step is started in the new task (step S405).

The new task is created for the following reason. If an application is started in the task context of the interpreter 103 without creation of the new task, other applications cannot be started until the application is completed. This implies failure in achieving the object for concurrent execution of multiple applications. As described above, after a first application is started, processing control is returned to step S402 to check if an application to be started remains. With multiple applications to be started specified with arguments, a routine of steps S402 to S405 is repeatedly performed for each of the specified applications.

When the interpreter 103 was started with no applications to be started specified for arguments, or all applications specified were already started, no application should remain to be processed in step S402. In this case, processing control is passed to step S406.

A routine of steps S406 to S408 awaits a task for starting an application or ending interpreter operations. First, the routine checks if an application has been specified from the keyboard 110 (step S406) in the following manner.

In addition to screens to be displayed by various applications, an application-starting window is displayed on the display 109 with a prompt for input of an application to be started. In response to the prompt, a user inputs a name of an application to be started and an argument to be passed to the application from the keyboard 110.

The keyboard input module 107 detects the inputted name of the application to be started and the argument to be passed to the application, and issues a notification of the detection to the interpreter 103. In response to the notification, the interpreter 103 judges in step S406 that an application to be started has been specified. Then, it passes processing control to step S404, thereby starting the steps for starting the specified application. If notification is not received, the interpreter 103 judges in step S406 that an application to be started has not been specified and passes processing control to step S407.

Step S407 checks if an application to be started has been specified through the network 111 in, for example, a procedure described below.

The interpreter 103 opens a predetermined port in advance for network communication. To open the port, the interpreter 103 uses the API provided by the OS 102 for control of network communication. Through the port, the interpreter 103 uses a predetermined communication protocol and thereby receives information such as a name of an application to be started and an argument to be passed to the application from remote devices, for example, the remote computers 112 (112a and 112b). For example, keyboards of the remote computers 112 are used to input and specify the name of the application to be started and the argument to be passed to the application.

In this manner, the information described above is received by the network communication module 104 and is notified to the interpreter 103.

Subsequently, similarly to step S406, step S407 judges whether or not an application to be started has been specified, and starts a new application if necessary. If no application needs to be stared, step S407 passes processing control to the next step. The above procedure allows users using the remote computers 112 to start applications via the computer 101.

Finally, the system checks if a termination command for the interpreter 103 is issued (step S408). In specific, the system checks if data representing an interpreter-termination command has been inputted from the keyboard.

If the system detects the interpreter-termination command, it performs various resource-deallocation processing as termination processing, such as termination of all applications currently in execution, deletion of tasks, and deallocation of used memory (step S409). Thus, the system ends processing of the interpreter 103. If the interpreter-termination command is not detected, processing control is returned to step S406 and the subsequent steps for checking if an application to be started has been specified are repeated.

As described above, the operation steps shown in FIG. 4 enable multiple applications to be started and executed concurrently.

To guarantee correct and expected operations of multiple applications, however, the class variable area must be allocated for each of the multiple applications. Steps to be performed in this case are described below with reference to a flowchart in FIG. 5.

FIG. 5 is a flowchart which shows steps in which, when the interpreter 103 starts an application in step S405 in FIG. 4, it executes the application in a new task started therefor.

As a prerequisite condition, when step S405 starts an application, the system specifies a starting class and a starting method for execution. Hereinbelow, the starting class and the starting method are called a main class and a main method, respectively. In this embodiment, the main class and the main method can be obtained uniquely according to names of applications.

First of all, an individual application area 203 corresponding to a started application is generated in the memory 201 (step S501).

Subsequently, for loading a bytecode of the main class into the memory 201, the location thereof must be retrieved. For this, a class-retrieval path having descriptions of a retrieval area for storing class bytecodes and retrieval sequence is used (step S502).

The class-retrieval path has a data format, as shown below.

dir1/aaa/bbb:/dir2/ccc:@remote1/dir3/ddd/eee:@remote2/dir4

The above data indicates four retrieval areas for a bytecode, as follows:

(1) /dir1/aaa/bbb represents a directory in the hard disk 108 in the computer 101;

(2) /dir2/ccc represents a directory in the hard disk 108 in the computer 101;

(3) /dir3/ddd/eee represents a directory in the remote computer 112a (remote1 represents a name of the remote computer 112a—a storage medium, such as a hard disk containing the directory is not shown in the figures.); and (4) /dir4 represents a directory in the remote computer 112b (remote2 represents a name of the remote computer 112b). The retrieval sequence is represented to be from (1) to (4). As a matter of course, the data notation is not restricted to the above.

The data of the class-retrieval path may be stored in the shared area 202 of the memory 201 so that the data which is unique in the interpreter 103, can be accessed during execution of any application. Any alternative arrangement may be such that, when applications to be started are specified, class-retrieval paths corresponding to the applications are concurrently specified; and the specified class-retrieval paths are stored in the corresponding individual application areas 203 to permit the different class-retrieval paths to be accessed for the individual specified applications to be started.

The latter case described above allows only areas required by applications to be started to be specified. In addition, the latter case does not require retrieval processing for paths not containing information relevant to classes for specified applications, therefore improving class-retrieval speeds.

After the area where bytecodes of the main class are stored is retrieved by use of the described class-retrieval path, the bytecodes are loaded therefrom into the shared area 202 (step S503).

Subsequently, the loaded bytecodes are analyzed to check for the existence of a class variable (step S504). If no class variable is detected, class-related processing is not performed; whereas if a class variable is detected, the system first generates a class variable area in the individual application area 203 (step S505). Then, the system checks if the class variable must be initialized (step S506).

In the above, if the bytecodes contain descriptions of initial data and class-variable initializing methods, the class variable must be initialized. If class-variable initialization must be performed, the class variable is initialized according to case-by-case requirements (step S507). Specifically, if initial data for the class is described, the described initial data is used to initialize the class variable area; and if a class-variable initializing method is described, the described class-variable initializing method is used to execute the interpreter 103. In short, prior to execution of the main method, the corresponding class-variable initializing method is executed. An execution method thereof is the same as that performed in steps S508 to S513, which will be described below.

As in the described manner, the class variable is initialized and a program counter (PC) is set to the top of a command sequence of the main method (step S508). The PC indicates interpretation and execution positions in the method command sequence of the interpreter 103. Then, processing enters a method-execution stage.

First, the system interprets a command in a position which the PC indicates (step S509). Then, the system judges if execution of the command requires a new class (step S510).

If the execution does not require a new class, the system simply executes the command (step S511) and moves the PC to a position of a next command to be executed in a control flow of the method command sequence (step S512). Subsequently, the system judges if the application terminates (step S513). If the application does not terminate, processing control returns to step S509 to repeat the above steps.

If execution of the command mentioned above requires a new class, which has never been loaded before, the system loads bytecodes of a new class, and generates and initialize a class variable area therefor (steps S515 to S520). Loading of the bytecodes is performed in steps similar to those for loading of the main-class bytecodes already described. Then, the command execution in step S511 continues.

In step S511 for command execution, when the command is to access a class variable area, execution is performed in the following manner. A class variable area to be accessed is already prepared in steps S518 to S520 (or in steps S505 to S507) and is ready to be accessed. The interpreter 103 designates a class variable area to be accessed according to information indicating a currently executing application and information in a class variable. The designated class variable area is thus accessed by the command.

In a specific explanation with reference to FIG. 3, during execution of the application B, when a command to be executed is to retrieve a value in the class variable y of the class X, it should retrieve data stored in the area 301e. In a manner similar to the above, the command accesses the area 301b during execution of the application A, and accesses the area 301h during execution of the application C. In this way, although method commands may be considered to access the same class variable, they actually access different class-variable areas depending on the application.

According to the above arrangements, individual applications are permitted to use class variables independently of usage methods of class variables for other applications. This reduces restrictions in programming, and in addition, reduces program bugs.

After an application is completed (YES in step S513) as a result of execution of, for example, a return command from the main method, the system performs termination processing, such as deallocation of resources used by the application (step S514). The termination processing also includes deletion of the individual application area 203 corresponding to the application.

Also, if classes used only by the completed application remain, bytecodes for the classes, which will not be used any more, may be unloaded from the shared area 202. This allows the memory 201 to be used even more effectively.

Also, counters may be provided for individual classes, each indicating the number of applications that use the classes. In this case, subtraction is performed on the counters for classes used by the applications in the termination processing (step S514). When the counter corresponding to a class indicates zero, no application using the class remains any more, and therefore, the class can be unloaded. This method allows even a class used by multiple applications to be unloaded.

In the above example, the shared area 202 in which bytecodes are loaded is assumed to be arranged in a RAM, but it may be arranged in a ROM. This is because bytecodes are unchangeable independently of the application-operation status. In the above case, steps for loading and unloading are not required; and in addition, class-retrieval path data and retrieval steps are not required.

According to the described embodiment, all the functions to be operated are not prearranged as one application, and multiple applications can be executed concurrently. In addition, multiple functions can be easily realized, and furthermore, flexibility and extendibility in programming can be improved.

Also, in the above case, the embodiment requires only one instance of the interpreter, thereby providing the advantage of allowing memory to be saved.

Also, the embodiment does not require selection and execution programs for selecting and executing multiple applications, thereby providing the advantage of allowing unnecessary work to be avoided.

Furthermore, the embodiment does not add restrictions, but it can perform correct and as-expected execution of multiple applications. This provides advantages in which unnecessary restrictions do not need to be considered, programming can be facilitated, and existing applications can be properly operated.

On condition that functions of the described embodiment can be implemented, the present invention may either be applied to a system configured of multiple apparatuses such as a main computer unit, interfacing devices, and a display, or to a system of a single apparatus.

As in the above, the present invention has been described with reference to the embodiment configured as described above. However, the invention can be realized by using either hardware or software. Therefore, the present invention includes a storage medium that contains software program codes for implementing the functions of the described embodiment.

Also, the present invention includes an embodiment in which software program codes for implementing the functions of the above-described embodiment are provided in a computer connected to the aforementioned devices for operating the various devices so as to implement the functions of the above-described embodiment, and the various devices are thereby operated by the system or the computer (or, a CPU or an MPU) according to the program. In this embodiment, the program codes read out from a storage medium implement the functions of the embodiment described earlier. Therefore, the program codes and a means for supplying the program codes to the computer, such as the storage medium containing the program codes, realize the present invention.

The storage medium can be a floppy disk, a hard disk, an optical disk, a CD-ROM, a CD-R, a magnetic tape, a nonvolatile memory card, a ROM, or the like.

Also, program codes may be read out by a computer and executed to implement the functions of the embodiments described above, and in addition, an operating system (OS) operating in the computer operates or cooperates with other application software products according to the program codes in order to implement the above-described functions. The program codes in this case are of course to be included in the scope of the present invention.

Another case may be such that, after program codes read out from a storage medium are written to a memory on a function-extension board inserted in a computer or to a function-extension unit connected to a computer, the CPU in the function-extension board or the function-extension unit performs a part of processing or entire processing according to the program codes, thereby implementing the functions of the above-described embodiments. This case is of course to be included in the scope of the present invention.

To apply the present invention to the above-described storage media, program codes corresponding to the described flowcharts are stored therein.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An interpreter for a programming language supporting class variables, said interpreter comprising:

receiving means for receiving specifying information for specifying an application to be started;

generating means for generating an individual application area corresponding to the application specified by the specifying information, wherein the individual application area does not store the data to be shared by a plurality of applications;

loading means for loading in a shared area, data for a class required to execute the specified application and to be shared by a plurality of applications;

allocating means for allocating class variable areas for the class variables in the individual application area corresponding to the specified application if a new class, having class variables is detected from classes required to execute the specified application;

executing means for executing the specified application by accessing the class variables in the individual application area corresponding to the specified application when the class variables are to be accessed;

deleting means for deleting the individual application area corresponding to the specified application when the specified application is terminated;

determination means for determining, when the specified application is terminated, whether or not the class required to execute the specified application is used by any other applications; and unloading means for unloading from the shared area, data for the class required to execute the specified application if the class is determined not to be used by any other applications.

2. An interpreter as claimed in claim 1, wherein said executing means generates tasks and executes the applications in the tasks.

3. An interpreter as claimed in claim 1, wherein said executing means executes multiple applications concurrently if multiple applications are specified with the specifying information.

4. An interpreter as claimed in claim 1, wherein said allocating means allocates areas in the class variable areas for all write-permitting class variables belonging to the class.

5. An interpreter as claimed in claim 1, wherein said allocating means checks if areas for the variables have already been allocated in the class variable areas when accessing the individual class variables during execution of the specified applications, and allocates areas for the variables if the areas have not yet been allocated.

6. An interpreter as claimed in claim 1, wherein said receiving means receives the specifying information as an argument.

7. An interpreter as claimed in claim 1, wherein said receiving means receives the specifying information as a keyboard input.

8. An interpreter as claimed in claim 1, wherein said receiving means receives the specifying information via a network.

9. An interpreter as claimed in claim 1, wherein the data for the class required to execute the specified application and to be shared by the plurality of applications is a bytecode of the class.

10. An interpreter as claimed in claim 9, wherein said loading means loads the bytecode of the class if the class required for execution of the specified application is a new class.

11. An interpreter as claimed in claim 10, further comprising retrieving means for retrieving a bytecode of the new class from a class-retrieval path.

12. An interpreter as claimed in claim 11, wherein the class-retrieval path is stored in the shared area.

13. An interpreter as claimed in claim 10, wherein the specifying information also specifies class-retrieval paths together with the application, and said allocating means stores the specified class-retrieval paths in the individual application area corresponding to the application.

14. An interpreter as claimed in claim 10, wherein said loading means judges if a new class for which no bytecodes have been loaded is required for execution of individual commands of the applications, and if the new class is judged to be required, said loading means loads the bytecodes for the new class in said shared area.

15. An interpreter as claimed in claim 10, further comprising:
   counters for individual classes for indicating the number of applications using the classes;
   decrement means for decreasing a value of the counter for the class used by the application when an application is terminated; and
   unloading means for unloading bytecodes for a class for which the value of the counter is zero.

16. An interpreter as claimed in claim 9, wherein said allocating means judges whether or not the new class has a class variable by analyzing the bytecodes of the class, which are stored in said shared area.

17. An interpreter as claimed in claim 9, further comprising initializing means for analyzing the bytecodes to judge if the class variable of the new class must be initialized, and for initializing the class variable of the new class if the class variable must be initialized.

18. An interpreter as claimed in claim 17, wherein said initializing means judges the class variable to be initialized if the bytecodes include initial data for the class variable, and uses the initial data to initialize the class variable.

19. An interpreter as claimed in claim 17, wherein said initializing means judges the class variable to be initialized if the bytecodes include a class-variable initializing method, and executes the class-variable initializing method to initialize the class variable.

20. A method of executing applications by an interpreter for a programming language supporting class variables, said method comprising:
   a receiving step of receiving specifying information for specifying an application to be started;
   a generating step of generating an individual application area corresponding to the application specified by the specifying information, wherein the individual application area does not store the data to be shared by plurality of applications;
   a loading step of loading in a shared area, data for a class required to execute the specified application and to be shared by a plurality of applications;
   an allocating step of allocating class variable areas for the class variables in the individual application area corresponding to the specified application if a new class having class variables is detected from classes required to execute the specified application;
   an executing step of executing the specified application by accessing the class variables in the individual application area corresponding to the specified application when the class variables are to be accessed;
   a deleting step of deleting the individual application area corresponding to the specified application when the specified application is terminated;
   a determination step of determining, when the specified application is terminated, whether or not the class required to execute the specified application is used by any other applications; and
   an unloading step of unloading from the shared area data for the class required to execute the specified application if the class is determined not to be used by any other applications.

21. A method as claimed in claim 20, wherein, in said executing step, tasks are generated and the applications are executed in the tasks.

22. A method as claimed in claim 20, wherein, in said executing step, multiple applications are executed concurrently if multiple applications are specified with the specifying information.

23. A method as claimed in claim 20, wherein, in said allocating step, areas in the class variable areas are allocated for all write-permitting class variables belonging to the class.

24. A method as claimed in claim 20, wherein, in said allocating step, checking if areas for the variables have already been allocated in the class variable areas when accessing the individual class variables during execution of the specified applications is performed, and areas for the variables are allocated if the areas have not yet been allocated.

25. A method as claimed in claim 20, wherein, in said receiving step, the specifying information is received as an argument.

26. A method as claimed in claim 20, wherein, in said receiving step, the specifying information is received as a keyboard input.

27. A method as claimed in claim 20, wherein, in said receiving step, the specifying information is received via a network.

28. A method as claimed in claim 20, further comprising a shared area of storing bytecodes of a class required for execution of one of the applications specified with the specifying information.

29. A method as claimed in claim 28, further comprising a loading step of loading bytecodes of the class if the class required for execution of the specified application is a new class.

30. A method as claimed in claim 29, further comprising a retrieving step of retrieving a bytecode of the new class from a class-retrieval path.

31. A method as claimed in claim 30, wherein the class-retrieval path is stored in the shared area.

32. A method as claimed in claim 29, wherein the specifying information also specifies class-retrieval paths together with the application, and said allocating step stores the specified class-retrieval paths in an individual application area corresponding to the application.

33. A method as claimed in claim 29, wherein said loading step judges if a new class for which no bytecodes have been loaded is required for execution of individual commands of the applications, and if the new class is judged to be required, said loading step loads the bytecodes for the new class in the shared area.

34. A method as claimed in claim 29, further comprising:
- a counting step of, for individual classes, indicating the number of applications using the classes;
- a decrement step of decreasing a value of the counter for the class used by the application when an application is terminated; and
- an unloading step of unloading bytecodes for a class for which the value of the counter is zero.

35. A method as claimed in claim 28, wherein said allocating step judges whether or not the new class has a class variable by analyzing the bytecodes of the class, which are stored in the shared area.

36. A method as claimed in claim 28, further comprising an initializing step of analyzing the bytecodes to judge if the class variable of the new class must be initialized, and for initializing the class variable of the new class if the class variable must be initialized.

37. A method as claimed in claim 36, wherein said initializing step judges the class variable to be initialized if the bytecodes include initial data for the class variable, and uses the initial data to initialize the class variable.

38. A method as claimed in claim 36, wherein said initializing step judges the class variable to be initialized if the bytecodes include a class-variable initializing method, and executes the class-variable initializing method to initialize the class variable.

39. A computer-readable program stored on a computer readable medium for controlling a computer to perform functions of an interpreter for a programming language supporting class variables, the program comprising codes for instructing the computer to perform a method comprising:
- a receiving step of receiving specifying information for specifying an application to be started;
- a generating step of generating an individual application area corresponding to the application specified by the specifying information, wherein the individual application area does not store the data to be shared by a plurality of applications;
- a loading step of loading in a shared area, data for a class required to execute the specified application and to be shared by a plurality of applications;
- an allocating step of allocating class variable areas for the class variables in the individual application area corresponding to the specified application if a new class having class variables is detected from classes required to execute the specified application;
- an executing step of executing the specified application by accessing the class variables in the individual application area corresponding to the specified application when the class variables are to be accessed;
- a deleting step of deleting the individual application area corresponding to the specified application when the specified application is terminated;
- a determination step of determining when the specified application is terminated, whether or not the class required to execute the specified application is used by any other applications; and
- an unloading step of unloading from the shared area, data for the class required to execute the specified application if the class is determined not to be used by any other applications.

* * * * *

UNITED STATES PATENT AND TRADEMARK OFFICE
CERTIFICATE OF CORRECTION

PATENT NO. : 6,807,664 B2  
DATED : October 19, 2004  
INVENTOR(S) : Hirokazu Ohi It is certified that error appears in the above-identified patent and that said Letters Patent is hereby corrected as shown below:

Title page, Item [54] and Column 1, line 2,  
Title, "INTERPRETER EXECUTION" should read -- INTERPRETER, EXECUTION --.

Title page,  
Item [56], References Cited, U.S. PATENT DOCUMENTS, insert  
-- 6,629,153    9/2003    Gupta, et al……….. 709/316 --.

Drawings,  
Figure 4, S408, "INIERPRETER" should read -- INTERPRETER --.  
Figure 5, S501, "INDIVISUAL" should read -- INDIVIDUAL --.  
Figure 5, S505, "INDIVISUAL" should read -- INDIVIDUAL --.  
Figure 5, S518, "INDIVISUAL" should read -- INDIVIDUAL --.

Column 6,  
Line 28, "stared," should read -- started, --.

Column 7,  
Lines 8 and 9, "dir1/aaa/bbb:/dir2/ccc:@remote1/dir3/ddd/eee:@remote2/dir4" should read -- /dirl/aaa/bbb:/dir2/ccc:@remotel/dir3/ddd/eee:@remote2/dir4 --.

Column 8,  
Line 41, "acturally" should read -- actually --.

Column 10,  
Line 34, "a new class," should read -- a new class --.

Column 11,  
Line 24, "the shared area" should read -- said shared area --.

UNITED STATES PATENT AND TRADEMARK OFFICE
CERTIFICATE OF CORRECTION

PATENT NO.    : 6,807,664 B2
DATED         : October 19, 2004
INVENTOR(S)   : Hirokazu Ohi It is certified that error appears in the above-identified patent and that said Letters Patent is hereby corrected as shown below:

Column 12,
Line 5, "plurality" should read -- a plurality --.

Signed and Sealed this

Twenty-eighth Day of February, 2006

JON W. DUDAS
*Director of the United States Patent and Trademark Office*